Nov. 23, 1954     H. D. IRVIN     2,695,378
TRANSFORMER CONTROLLED RELAY
Filed Oct. 14, 1952
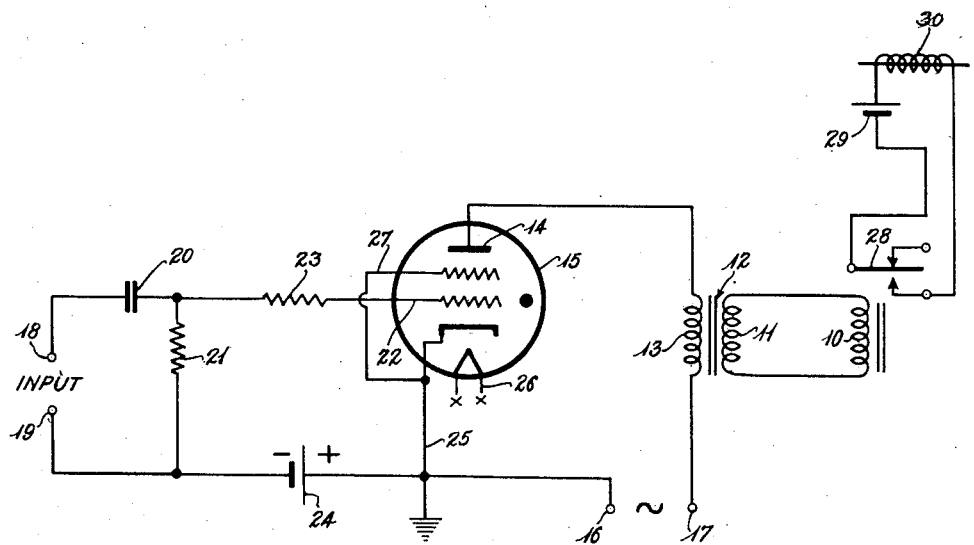
INVENTOR
*Henry D. Irvin*
BY *Met R. Poston*
ATTORNEY

United States Patent Office 2,695,378
Patented Nov. 23, 1954

2,695,378

TRANSFORMER CONTROLLED RELAY

Henry D. Irvin, Enka, N. C., assignor to American Enka Corporation, Enka, N. C., a corporation of Delaware Application October 14, 1952, Serial No. 314,677

1 Claim. (Cl. 317—149)

This invention relates to a device for actuating a relay and, more particularly, to an electrical circuit for obtaining quick response of a relay to control signals therefor.

It is often necessary to provide a relay in an electrical circuit for opening and closing auxiliary circuits or for actuating certain mechanisms. In such systems wherein the actuation is responsive to control signals in the form of A. C. signal trains of short duration it is necessary to insure that the relay responds quickly to these control signals and does not lag. In the past it has been proposed to use a circuit including a Thyratron in the actuating circuit. A Thyratron tube, as is well known, is fired when the proper voltage conditions exist between plate and grid. Once the tube has been fired the grid losses control and cannot quench the tube. The only means of so quenching is by control of the plate voltage. In actuating circuits using such a tube it has been the practice to connect a D. C. relay coil directly in the plate circuit thereof shunted by a filter network and to use an A. C. plate supply voltage. The use of an A. C. plate supply voltage automatically achieves the purpose of quenching the tube once during each voltage cycle. However, it necessitates the use of a filter network whose time constant is such that the voltage across the relay coil does not fall below that potential necessary to hold the armature while the tube is non-conducting. In such a case it has been found that when using control signals whose repetition rate is quite high, the relay response is very sluggish.

It is, therefore, an object of this invention to provide an actuating circuit for a relay which overcomes the sluggish response above referred to and which permits the relay to follow quickly the control signal pulses to which it must respond.

These and other objects will become apparent from the following description of the accompanying drawing.

The single figure presented illustrates a typical circuit diagram of the present invention.

The invention will be described specifically with respect to the operation of a solenoid by a relay. The invention has other applications and this specification is designed only to illustrate one such application. The relay coil 10 is connected to the secondary 11 of a transformer 12. The primary 13 of this transformer is connected in the circuit of the plate 14 of the Thyratron tube 15. The plate 14 is supplied with an alternating current of suitable voltage and frequency, which plate voltage is available between ground post 16 and post 17.

Short duration control signals are introduced between posts 18 and 19. The condenser 20 serves as a D. C. blocking condenser, and grid leak resistor 21 completes a D. C. path from the grid current limiting resistor 23 to the battery 24. The control signals are fed to the grid 22 through blocking condenser 20 and grid leak resistor 23. A battery 24 connected between the resistor 21 and ground supplies a negative bias between grid 22 and cathode 25. Cathode 25 is connected directly to ground and heated by filaments 26. Also connected to the cathode is the shield grid 27. When the plate voltage of tube 15 swings sufficiently positive it can be fired when a positive pulse appears on the grid 22. The firing of the tube causes plate current to flow through primary 13 as long as the plate voltage is sufficiently positive. When, during its swing the plate voltage decreases sufficiently so that it can no longer support the firing of the tube, the tube is quenched. The pulse of current maintained during the firing condition of the tube flows in primary 13 and is induced into secondary 11 and, of course, also in the relay coil 10. The characteristics of transformer 12 are such that the pulsating D. C. voltage in primary 13 is modified in secondary 11 to an approximately sinusoidal A. C. wave form. The relay composed of coil 10, lever 28, and associated contact points is of the fast-acting A. C. type and thus quickly responds to the output of secondary 11. The energizing of the coil 10 attracts the pivoted biased relay lever 28 downwardly to close the circuit of the battery 29. Current then flows from the battery through the solenoid coil 30 to energize said solenoid.

Due to the transformer coupling of the relay coil to the plate circuit of the Thyratron tube, coil 10 is energized and lever 28 responds immediately upon the firing of the Thyratron tube. Lever 28 remains in its downward position until the tube 15 is quenched unless this tube is fired at such a rapid rate that the inertia of the lever 28 prevents its movement between rapidly occurring firing and quenching cycles. In such an event the lever will remain down until the tube is quenched for a sufficient period of time to allow it to return to its original position. In any event, because of the rapid response characteristics of the relay, the lever 28 does respond instantly to the firing of the tube 15.

What has been described is a specific embodiment of the present invention. Other embodiments obvious from the teachings herein to those skilled in the art are contemplated to be within the spirit and scope of the following claim.

What is claimed is:

An actuating circuit for a relay having a relay coil that includes a Thyratron tube having an A. C. plate voltage supply, means to fire said tube, a transformer, the primary of said transformer being in the plate circuit of said Thyratron tube and the secondary thereof being coupled to said relay coil.

References Cited in the file of this patent

UNITED STATES PATENTS

| Number | Name | Date |
|---|---|---|
| 1,869,829 | Skellett et al. | Aug. 2, 1932 |
| 2,001,837 | Craig | May 21, 1935 |
| 2,001,838 | Craig | May 21, 1935 |
| 2,097,578 | Swart et al. | Nov. 2, 1937 |
| 2,105,134 | Wintsch | Jan. 11, 1938 |
| 2,326,622 | Crooks | Aug. 10, 1943 |
| 2,556,785 | Abbott | June 12, 1951 |